March 4, 1952

N. H. RICKER 2,588,291

DISTORTIONLESS SEISMIC WAVE FILTER

Filed Oct. 11, 1947

Norman H. Ricker  Inventor

By W. O. J. Heilman  Attorney

Patented Mar. 4, 1952

2,588,291

UNITED STATES PATENT OFFICE 2,588,291

DISTORTIONLESS SEISMIC WAVE FILTER

Norman H. Ricker, Tulsa, Okla., assignor to Standard Oil Development Company, a corporation of Delaware Application October 11, 1947, Serial No. 779,260

2 Claims. (Cl. 177—352)

The present invention relates to geophysical exploration in which the reflections or refractions of seismic waves from sub-strata are studied to determine the depth and nature of such sub-strata. The invention relates particularly to the improved design of a low pass high suppression filter for use in seismic prospecting.

Geophysical explorations of this type are typically carried out by setting off a charge of explosives at a selected point, known as the shot point, and picking up the seismic waves emanating from the explosion after they had been reflected, or refracted, by sub-strata. Geophones, or seismo pick-ups used to receive the seismic waves are arrayed in any desired way, generally in line with the shot point and spaced from the shot point, and from each other. These geophones are devices which are provided with means for converting the mechanical vibrations, imparted by seismic waves, into electrical impulses. Each geophone is connected to a suitable electrical amplifying circuit, the output of which is connected to a moving coil galvanometer with a mirror attached to the coil. Conventionally these galvanometers are arrayed in a battery relative to a light source and a moving strip of sensitized paper, so that a plurality of wave forms, or traces will be recorded on the paper, each trace corresponding to the seismic wave received by a particular geophone. The strip of recording paper is moved longitudinally at a substantially constant speed, and is provided with transverse time marks so as to make possible the indication of the instant of the shot, and the determination of the time of arrival of any particular point on the traces after the firing of the shot.

The use of records so produced to get information as to the sub-surface structure of the earth, is based on the principle that part of the energy of the seismic disturbance caused by the explosion will travel downwardly into the earth and be reflected, or refracted, back to the surface by various more or less well defined strata existing below the surface, and that the arrival of reflected energy at the surface will be detectable on the record.

In actual practice the identification of traces on the record as reflected or refracted waves is very often extremely difficult. This is largely due to the fact that the traces generally show rather continuous random disturbances, resulting from energy coming to the geophones directly from the shot, or created by outside disturbances such as moving objects in the vicinity, or the wind. The reception of weak and multiple reflections is a further complication. It is known that by filtering the electrical outputs of the receiving geophones, to eliminate high frequencies, the random disturbances of the type mentioned may be minimized. In general this is possible since seismic energy reflected, or refracted, from a deep sub-stratum has been attenuated in its higher frequencies by the transmission through the earth. Consequently, disturbances of the type mentioned generally have a larger proportion of high frequency components. A variety of filters have been proposed as suitable to accomplish the desired high frequency suppression of the geophone impulses. In general, however, such filters sufficiently distort the signals received by the geophones, so that the benefit realized from the use of the filters is in part nullified.

I have now discovered a type of filter capable of attenuating undesirable higher frequencies without distorting the reflected or refracted seismic energy which is received by the geophones.

The nature of my invention and the objects thereof will become apparent in the following detailed description, in connection with the accompanying drawings, in which.

The present invention is an outgrowth of fundamental seismic studies, the results of which have been published in the following publications: Geophysics—October, 1940—pages 348–366; Geophysics—April, 1945—pages 207–220; Bulletin of the Seismological Society of America, July, 1943—pages 197–228.

Figures 1, 2:
Figure 1 represents the characteristic form of a "displacement seismic wavelet" produced by an explosion in the earth.
Figure 2 represents a "velocity wavelet" which is a derivative of the displacement wavelet of Figure 1.

As a result of these studies it has been discovered that on the detonation of a charge of high explosive at a point in the earth, a seismic disturbance of a characteristic form, such as shown in Figure 1, proceeds into the earth from the point of detonation. This form represents what may be called the "displacement" form of a seismic wavelet, since it represents the manner in which the elastic displacement of the earth varies with time. This displacement wavelet, when received by the geophones, and transduced to electrical impulses, results in a wavelet form as shown in Figure 2. By the nature of the transformation of the earth vibrations into electrical impulses by the geophones, the wavelet form produced as shown in Figure 2 is the derivative of the wavelet shown in Figure 1. As the wavelet of Figure 2 is thus derived from the displacement wavelet of Figure 1, the wavelet of Figure 2 may be called a "velocity wavelet." Using conventional geophones and associated amplifiers and records, this velocity wavelet is representative of the variation of voltage changes recorded.

I have found that a velocity wavelet of the type illustrated may be considered to be made up of an infinite combination of single frequency sinusoidal components covering the entire range of frequencies from zero to infinite frequency. A spectrum may be developed for each velocity wavelet showing the relative occurrence of each of the frequencies. In general, due to the transmission properties of the earth, the peak of such a spectrum is in the range of about 40–100 cycles. These relations may be expressed mathematically by the integral form:

$$-\int_0^\infty \frac{f^2}{f_1^2} e^{-\frac{f^2}{f_1^2}} \cos 2\pi ft \cdot \frac{df}{f_1}$$

In this expression "$e$" is the base of natural logarithms and the time "$t$" is measured from the wavelet center. The expression shows that a velocity wavelet is a composite of single frequency components. It also shows that all of these single frequency components are in phase at the wavelet center. This may be verified by noting the deep valley at the center of the wavelet.

It has also been discovered that seismic waves of all frequencies, encountered in seismic prospecting, travel through the ground at substantially the same velocity. As a result all such waves arriving at a receiving pick-up, from any given sub-stratum, have the same phase relationship as that which obtained at the substratum. This fact is evident from the peaks which characterize reflections and the effect which a change in phase of the various frequency components of the waves would have on these peaks. Any change in the phase relationship of the various frequency components of reflected waves would have a tendency to lower the peaks of the wavelet. As this is not the case it is apparent that all seismic energy, of whatever frequency, travels through the ground at substantially the same velocity.

Figure 3:
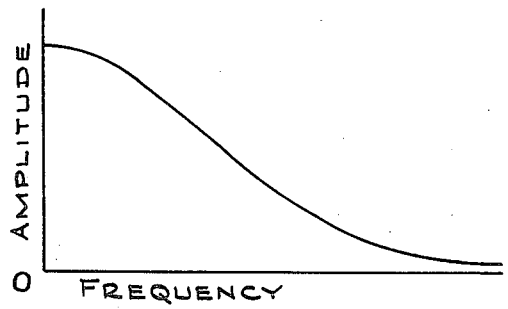
Figure 3 shows the attenuation of higher frequency components of seismic energy caused by transmission through the earth.

As before stated, the transmission of seismic energy through the earth causes attenuation of the higher frequency components of the seismic energy. It has been found that this attenuation may be represented by a curve which is shown in Figure 3. It will be noted from this curve that extremely low frequency components of a wavelet will be transmitted with less attenuation than the higher frequency components. The mathematical expression for the curve of Figure 3, has been found to be of the form:

$$A = A_0 e^{-\frac{f^2}{f_0^2}}$$

In this expression "$f$" is the frequency of a sinusoidal component of the seismic wavelet, "$A_0$" the amplitude of this component at a certain point in the earth, and "$A$" the amplitude after passing to another point in the earth. Expression "$f_0$" is a reference frequency determined by the amount of earth passed through and the nature of the earth.

Applying the above principles, I have now found that if a high suppression filter is built, having a filter characteristic providing substantially the same attenuation as that caused by the earth, no distortion of a filtered wavelet will occur. A filter constructed according to my invention will thus have a filter characteristic, $$\frac{E_0}{E_1} = e^{-\left(\frac{f^2}{f_0^2}\right)}$$

wherein "$E_0$" is the output voltage of the filter, "$E_1$" is the input voltage of the filter, "$e$" is the base of natural logarithms, "$f$" is any particular frequency, and "$f_0$" is the reference frequency whose value lies in the general range of dominant apparent frequencies, as found in a normal seismogram. In addition to the above attenuation characteristic, it is essential that the filter have a linear phase shift characteristic with the phase intercept zero, or an integral multiple of $\pi$. This is equivalent to the requirement that all of the single frequency sinusoidal components of the wavelet move through the filter in the same absolute time. By theoretical analysis, or by experiment it may be shown that a filter having these characteristics will filter high frequency seismic energy without causing distortion of reflected, or refracted wavelets. The amplitude of such a filtered wavelet will be slightly reduced, and the wavelet will be slightly broadened, but will not be altered in form.

Figure 4:
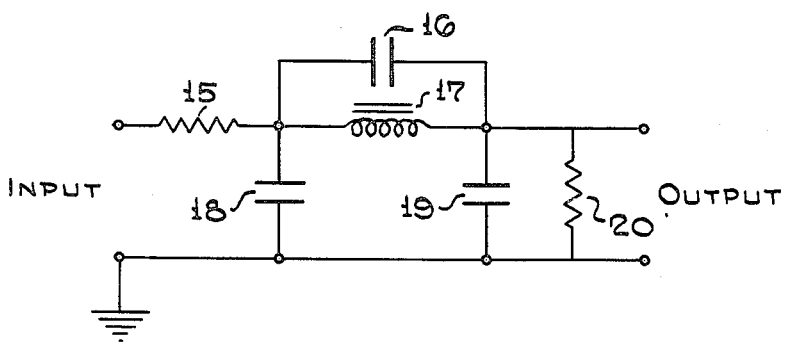
Figure 4 represents one embodiment of the type of filter constructed according to my invention.

The design of filters is well known to the art. For this reason, it is no part of the present invention to provide a particular filter, but rather the present invention contemplates the use of any filter having the characteristics indicated. By way of example, therefore, a suitable type of filter is indicated in Figure 4. As shown in Figure 4, the filter comprises an input resistance 15 which is connected to a condenser 16 and inductance 17, which are in parallel at the junction point of the resistance. The condenser and the inductance are coupled to ground through a condenser 18. Similarly, the output of the paralleled condenser 16 and inductance 17 is by-passed to ground through condenser 19 in parallel with a resistance 20.

In the case where "$f_0$" is 100 cycles per second, suitable values for the electrical components of the filter are: resistance 15=resistance 20=$\frac{1}{10}$ megohm. Capacitance 18=capacitance 19=.01 mfd. Capacitance 16=.00176 mfd. Inductance 17=450 henries. It is apparent the circuit constants given may be modified to correspond to the dominant frequency encountered in a particular locality. It is also apparent that filters of different types may be designed according to this invention.

It will be noted that since this filter has the same type of attenuation characteristics as that caused by transmission through the earth, use of such a filter is equivalent to placing the receiving geophones at an increased distance from the source of any disturbances received, and recorded. By this means, therefore, it is possible to filter out undesirable high frequency components without distorting the reflected, or refracted, wavelets also passing through the filter. It is apparent, therefore, that the appearance and clarity of the resulting record of the output of a receiving geophone will be materially improved by the use of this filter, and the interpretation of the record will be correspondingly simplified.

Having now fully described my invention, I claim:

1. In an apparatus for detecting and recording seismic waves, including means for converting the detected waves into electrical impulses, an improved filter for said electrical impulses having an amplitude response characteristic of the form $$\frac{E_0}{E_1} = e^{-\left(\frac{f}{f_0}\right)^2}$$

in which $E_0$ is the output voltage of the filter, $E_1$ is the input voltage of the filter, $e$ is the base of natural logarithms, $f$ is any particular frequency received by the filter, and $f_0$ is a reference frequency.

2. Improved filter according to claim 1 having a linear phase shift characteristic.

NORMAN H. RICKER.

REFERENCES CITED

The following references are of record in the file of this patent:

UNITED STATES PATENTS

| Number | Name | Date |
|---|---|---|
| 2,144,812 | Rieber | Jan. 24, 1939 |
| 2,351,456 | Ricker | June 13, 1944 |

OTHER REFERENCES

Radio Engineers' Handbook by F. E. Terman, McGraw-Hill Book Company, 1943, pages 227 and 228.